United States Patent
Haijima et al.

(10) Patent No.: US 10,065,490 B2
(45) Date of Patent: Sep. 4, 2018

(54) STRUCTURE FOR MOUNTING ELECTRIC STORAGE APPARATUS

(75) Inventors: Hiroaki Haijima, Odawara (JP); Kouichi Daigaku, Okazaki (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/351,343

(22) PCT Filed: Oct. 13, 2011

(86) PCT No.: PCT/JP2011/005736
§ 371 (c)(1),
(2), (4) Date: Apr. 11, 2014

(87) PCT Pub. No.: WO2013/054380
PCT Pub. Date: Apr. 18, 2013

(65) Prior Publication Data
US 2014/0287290 A1    Sep. 25, 2014

(51) Int. Cl.
*H01M 2/10* (2006.01)
*B60K 1/04* (2006.01)

(52) U.S. Cl.
CPC ............ *B60K 1/04* (2013.01); *H01M 2/1083* (2013.01); *B60K 2001/0416* (2013.01); *B60Y 2306/01* (2013.01); *H01M 2220/20* (2013.01)

(58) Field of Classification Search
None
See application file for complete search history.

(56) References Cited

U.S. PATENT DOCUMENTS

| | | | |
|---|---|---|---|
| 6,624,610 B1 * | 9/2003 | Ono et al. | 320/104 |
| 7,025,160 B2 * | 4/2006 | Awakawa | 180/68.5 |
| 2004/0235315 A1 | 11/2004 | Masui et al. | |
| 2006/0016633 A1 | 1/2006 | Fujii et al. | |
| 2008/0062622 A1 | 3/2008 | Fukazu et al. | |
| 2009/0186266 A1 | 7/2009 | Nishino et al. | |
| 2009/0242298 A1 * | 10/2009 | Guss | B60K 1/04 180/68.5 |
| 2010/0190044 A1 | 7/2010 | Nishino et al. | |
| 2010/0213741 A1 | 8/2010 | Suzuki et al. | |

FOREIGN PATENT DOCUMENTS

| | | |
|---|---|---|
| CN | 1572559 A | 2/2005 |
| CN | 101569053 B | 8/2011 |
| CN | 202006772 U | 10/2011 |
| JP | 2000-351329 A | 12/2000 |
| JP | 2004-243885 A | 9/2004 |
| JP | 2004-345454 A | 12/2004 |
| JP | 2007-076477 A | 3/2007 |
| JP | 2007-161075 A | 6/2007 |
| JP | 2008-062780 A | 3/2008 |
| JP | 2011-126451 A | 6/2011 |
| WO | 2004/071798 A1 | 8/2004 |

* cited by examiner

*Primary Examiner* — Ladan Mohaddes

(74) *Attorney, Agent, or Firm* — Hunton Andrews Kurth LLP

(57) ABSTRACT

A structure for mounting an electric storage apparatus includes the electric storage apparatus outputting an energy for use in running of a vehicle, a vehicle body including a recessed portion housing the electric storage apparatus, a fastening member fixing the electric storage apparatus to the recessed portion, and a reinforce. The reinforce is disposed at a position surrounding the electric storage apparatus together with the recessed portion and is fixed to the vehicle body. The reinforce presses the electric storage apparatus against the recessed portion.

8 Claims, 4 Drawing Sheets

STRUCTURE FOR MOUNTING ELECTRIC STORAGE APPARATUS

CROSS-REFERENCE TO RELATED APPLICATIONS

This is a national phase application based on the PCT International Patent Application No. PCT/JP2011/005736 filed on Oct. 13, 2011, the entire contents of which are incorporated herein by reference.

TECHNICAL FIELD

The present invention relates to a structure for mounting an electric storage apparatus onto a vehicle.

BACKGROUND ART

Each of Patent Documents 1 to 3 has described a vehicle in which an electric double layer capacitor or a battery pack is fixed to a vehicle body. An exemplary method for the fixing of the battery pack to the vehicle body is fastening with bolts as described in Patent Document 1.

PRIOR ART DOCUMENTS

Patent Documents

[Patent Document 1] Japanese Patent Laid-Open No. 2004-345454
[Patent Document 2] Japanese Patent Laid-Open No. 2004-243885
[Patent Document 3] Japanese Patent Laid-Open No. 2000-351329

DISCLOSURE OF THE INVENTION

Problems to be Solved by the Invention

When the vehicle body is vibrated due to running of the vehicle or the like, the vibration is transferred to the battery pack. The vibration of the battery pack may produce noise. Especially when the battery pack is disposed in the interior of the car, the noise may reach an occupant.

Means for Solving the Problems

A structure for mounting an electric storage apparatus according to the present invention includes the electric storage apparatus outputting an energy for use in running of a vehicle, a vehicle body including a recessed portion housing the electric storage apparatus, a fastening member fixing the electric storage apparatus to the recessed portion, and a reinforce. The reinforce is disposed at a position surrounding the electric storage apparatus together with the recessed portion and is fixed to the vehicle body. The reinforce presses the electric storage apparatus against the recessed portion.

According to the present invention, the reinforce can be used to press the electric storage apparatus against the recessed portion to reduce the vibration of the electric storage apparatus. In the structure in which the electric storage apparatus is fixed to the recessed portion by the fastening member, the running of the vehicle or the like may vibrate the electric storage apparatus. When the electric storage apparatus is pressed against the recessed portion, the vibration of the electric storage apparatus can be reduced, and the production of noise resulting from the vibration of the electric storage apparatus can be suppressed.

The reinforce can be placed at the position surrounding the electric storage apparatus together with the recessed portion and can be fixed to the vehicle body to enhance the strength of the recessed portion. The recessed portion with the enhanced strength can protect the electric storage apparatus housed in the recessed portion.

An elastic member elastically deformable can be disposed between the reinforce and the electric storage apparatus. The elastic member can be used to press the electric storage apparatus against the recessed portion. The use of the elastic member can provide an interval between the reinforce and the electric storage apparatus to allow errors in assembly of the reinforce and the electric storage apparatus. Alternatively, the reinforce can be fixed to the electric storage apparatus. The use of the reinforce can improve the strength of the electric storage apparatus.

A positioning mechanism can be used to position the electric storage apparatus to the recessed portion. The positioning mechanism can include a pin and a guide mechanism. The pin can be provided for one of the electric storage apparatus and the recessed portion, and the guide member can be provided for the other of the electric storage apparatus and the recessed portion. The guide member is used to guide the pin to an opening portion into which the pin is to be inserted. The opening portion into which the pin is to be inserted can be provided at a position different from the guide member or can be provided for the guide member.

The positioning mechanism can be disposed at a position adjacent to the fastening member used for fastening the electric storage apparatus to the recessed portion. This facilitates the attachment of the fastening member when the electric storage apparatus is positioned to the recessed portion by using the positioning mechanism.

The recessed portion can be provided below a luggage space of the vehicle. The reinforce can be disposed to extend in a front-rear direction of the vehicle. When the recessed portion is located below the luggage space, the recessed portion may be impacted at the back of the vehicle. Since the reinforce extends in the front-rear direction of the vehicle, the recessed portion can have the strength increased to resist the impact at the back of the vehicle.

When the reinforce extends in the front-rear direction of the vehicle, a first fastening member can be used to fasten an end portion of the reinforce located closer to the back of the vehicle to the vehicle body. In addition, a second fastening member can be used to fasten an end portion of the reinforce located closer to the front of the vehicle to the vehicle body. The first fastening member can be disposed along the front-rear direction of the vehicle. The second fastening member can be disposed along an up-down direction of the vehicle. The different fastening directions of the first fastening member and the second fastening member can suppress the loosening of the fastening of the reinforce to the vehicle body.

When a plurality of fastening members are used to fasten the reinforce to the vehicle body, the plurality of fastening members are disposed along different directions to achieve different fastening directions. This can suppress the loosening of the fastening of the reinforce to the vehicle body.

MODE FOR CARRYING OUT THE INVENTION

Embodiments of the present invention will hereinafter be described.

Embodiment 1

Description is now made of a structure for mounting a battery pack (electric storage apparatus) which is Embodiment 1 of the present invention. The battery pack according to the present embodiment is mounted on a vehicle. Examples of the vehicle include a hybrid car and an electric car. The hybrid car includes not only the battery pack but also a fuel battery or an engine as the power source for running of the vehicle. The electric car includes only the battery pack as the power source for running of the vehicle.

Figure 1:
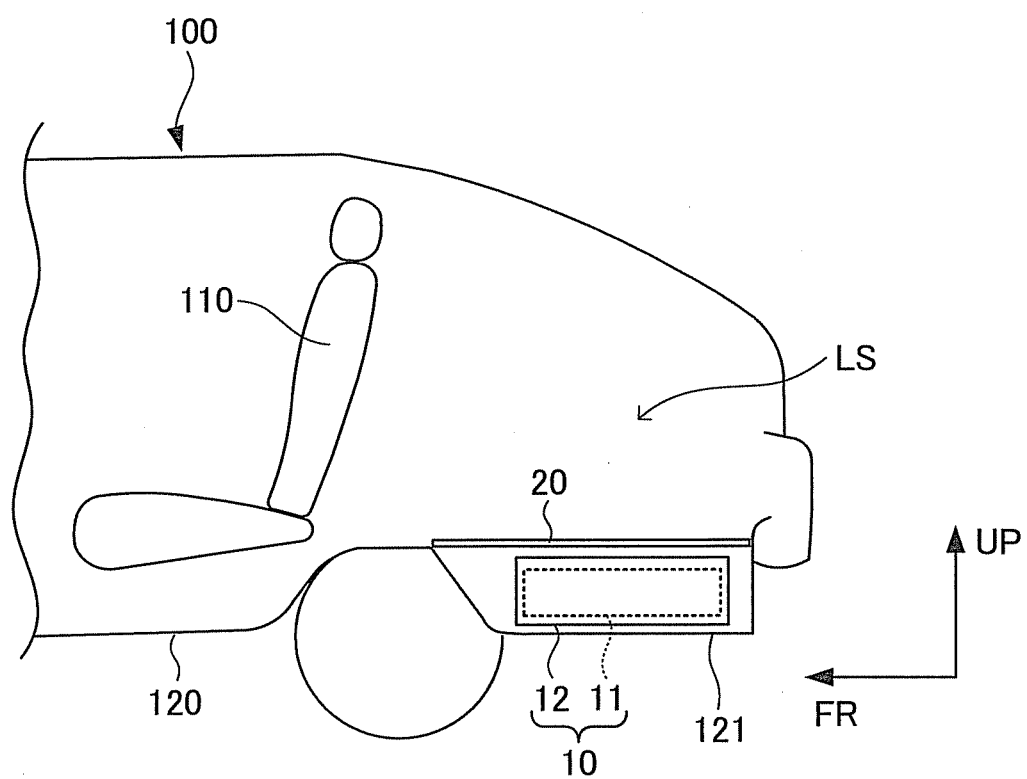
FIG. 1 is a schematic diagram showing the structure of a portion of a vehicle.

FIG. 1 is a schematic diagram showing the structure of a portion of the vehicle. In FIG. 1, an arrow FR indicates a direction in which the vehicle runs forward, and an arrow UP indicates an upward direction of the vehicle. The arrow FR and the arrow UP similarly indicate these directions in the other figures.

A seat 110 is disposed in the interior of the car. The interior of the car refers to the space where an occupant rides. The seat 110 is fixed to a floor panel 120 of a vehicle 100. The floor panel 120 is a portion of a vehicle body. A luggage space LS is provided at the back of the sheet 110 in the vehicle 100. The luggage space LS is a space mainly for putting luggage. Although the luggage space LS communicates with the interior of the car in the vehicle 100 of the present embodiment, the present invention is not limited thereto. Specifically, the luggage space LS and the interior of the car may be separated by a member mounted on the vehicle 100.

The floor panel 120 has a recessed portion 121 at the position associated with the luggage space LS. The recessed portion 121 is positioned below the luggage space LS. In a conventional vehicle, the recessed portion 121 may be used for housing a spare tire. In the vehicle 100 of the present embodiment, a battery pack 10 is housed in the recessed portion 121. The battery pack 10 does not protrude from the recessed portion 121 toward the luggage space LS.

An upper face of the battery pack 10 is covered with a deck board 20. The deck board 20 is formed in a flat plate shape and used for defining the luggage space LS. The space located above the deck board 20 serves as the luggage space LS.

The battery pack 10 has an assembled battery 11 and a case 12 for housing the assembled battery 11. The assembled battery 11 has a plurality of cells connected electrically in series. A secondary battery such as a nickel metal hydride battery or a lithium-ion battery can be used as the cell. An electric double layer capacitor may be used instead of the secondary battery.

The cell may have any shape. For example, a so-called cylindrical-type or square-type battery can be used as the cell. The cylindrical-type battery has an outer shape conforming to a cylinder. The square-type battery has an outer shape conforming to a rectangle.

An electric energy output from the assembled battery 11 is used for running the vehicle 100. Specifically, the power output from the assembled battery 11 is supplied to a motor generator. The motor generator receives the power output from the assembled battery 11 to produce a kinetic energy for use in running of the vehicle. The motor generator is coupled to wheels, and the kinetic energy produced by the motor generator is transferred to the wheels.

For decelerating or stopping the vehicle 100, the motor generator converts a kinetic energy generated in braking of the vehicle 100 into an electric energy. The electric energy produced by the motor generator can be supplied to the assembled battery 11 to charge the assembled battery 11. A DC/DC converter and an inverter can be placed on a current path connecting the assembled battery 11 with the motor generator. The DC/DC converter can be used to increase the voltage output from the assembled battery 11 to supply the increased voltage to the motor generator. The inverter can be used to allow an AC motor to be used as the motor generator.

The assembled battery 11 may include a plurality of cells connected electrically in parallel. The number of the cells constituting the assembled battery 11 can be set as appropriate in view of the output or the like required of the assembled battery 11. The case 12 can be made of metal, for example. The assembled battery 11 is fixed to an inner wall face of the case 12. For example, the assembled battery 11 can be fixed to the case 12 by fastening with bolts. The case 12 is fixed to a bottom face of the recessed portion 121.

The case 12 can house other devices than the assembled battery 11. Examples of the other devices include a system main relay, a battery monitoring unit, a current sensor, and a current breaker. The system main relay is switched between ON and OFF to connect the assembled battery 11 with the motor generator or to disconnect the assembled battery 11 from the motor generator. The battery monitoring unit can monitor the voltage and the temperature of the assembled battery 11. The current sensor detects the values of current when the assembled battery 11 is charged and discharged. The current breaker includes a plug and can break the current passing through the assembled battery 11 when the plug is withdrawn.

Figure 2:
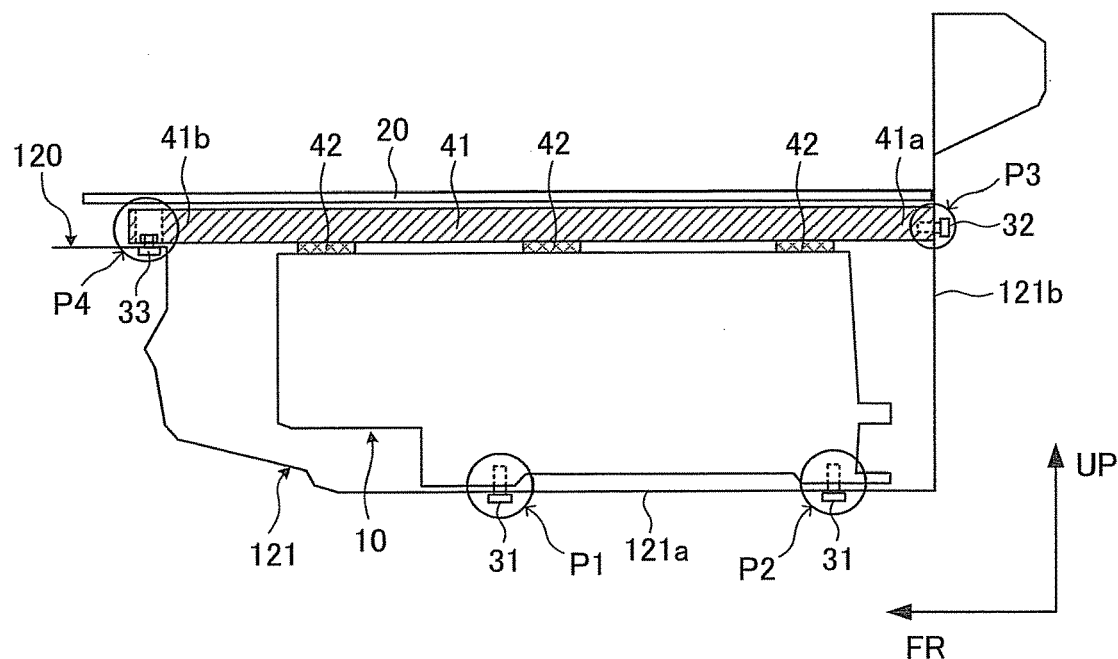
FIG. 2 is a side view of a structure for mounting a battery pack in Embodiment 1.
Figure 3:
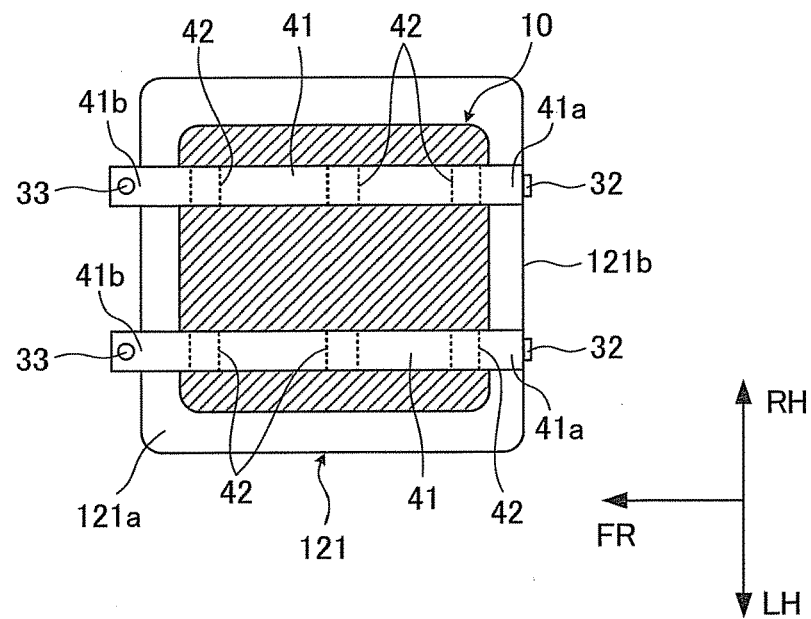
FIG. 3 is a top view of the structure for mounting the battery pack in Embodiment 1.

FIG. 2 is a side view of a structure for mounting the battery pack 10. FIG. 3 is a top view of the structure for mounting the battery pack 10. In FIG. 3, an arrow RH indicates a right direction when the vehicle faces forward, and an arrow LH indicates a left direction when the vehicle faces forward.

A bottom face of the battery pack 10 (case 12) is fixed to a bottom face 121a of the recessed portion 121 at fastening positions P1 and P2. The fastening of the battery pack 10 to the recessed portion 121 (bottom face 121a) is performed, for example, by using bolts 31 serving as fastening members. The fastening structure with the bolts 31 may be different from that shown in FIG. 2. For example, although the bolts 31 are provided for the recessed portion 121 in the present embodiment, the bolts 31 may be provided for the battery pack 10.

Reinforces 41 are disposed on the upper face of the battery pack 10. As shown in FIG. 3, two reinforces 41 are disposed on the upper face of the battery pack 10. The reinforce 41 extends in a front-rear direction of the vehicle 100 (direction of the arrow FR). As shown in FIG. 2, the reinforces 41 surround the battery pack 10 together with the recessed portion 121.

Although the reinforce 41 extends in the front-rear direction of the vehicle 100 in the present embodiment, the present invention is not limited thereto. It is only required that the reinforce 41 should be disposed on the upper face of the battery pack 10. For example, the reinforce 41 may be placed to extend in a left-right direction of the vehicle 100 (directions of the arrow RH and the arrows LH). Alternatively, the reinforce 41 may be placed to extend at an angle with respect to the front-rear direction and the left-right direction of the vehicle 100. The reinforce 41 may be fixed to the floor panel 120 as described later.

Although the two reinforces 41 are used in the present embodiment, the number of the reinforces 41 can be set as appropriate. Although the reinforce 41 is formed in a long strip shape, the present invention is not limited thereto, and the reinforce 41 is only required to be placed on the upper face of the battery pack 10. For example, a member having a flat plate shape may be used as the reinforce instead of the reinforce 41 in the present embodiment. The reinforce of the flat plate shape may entirely cover the upper face of the battery pack 10 or partially cover the upper face of the battery pack 10.

One end 41a of the reinforce 41 is fixed to a side face 121b of the recessed portion 121. At a fastening position 23, the reinforce 41 is fastened to the recessed portion 121 (side face 121b) by a bolt 32 serving as a fastening member. The side face 121b extends in the upward direction of the vehicle 100 from the bottom face 121a. The fastening structure with the bolt 32 may be different from that shown in FIG. 2.

The other end 41b of the reinforce 41 is fixed to an area of the floor panel 120 other than the recessed portion 121. At a fastening position P4, the reinforce 41 is fastened to the floor panel 120 by a bolt 33 serving as a fastening member. The fastening structure with the bolt 33 may be different from that shown in FIG. 2.

The two reinforces 41 shown in FIG. 3 are fixed to the floor panel 120 as shown in FIG. 2. The deck board 20 is placed above the two reinforces 41. The deck board 20 is omitted in FIG. 3.

Elastic members 42 are disposed between the reinforces 41 and the battery pack 10. In the present embodiment, three elastic members 42 are disposed for one reinforce 41, and the three elastic members 42 are placed in a longitudinal direction of the reinforce 41. It is only required that the elastic member 42 should be made of a material capable of elastic deformation. For example, rubber or felt can be used for the elastic member 42. EPDM (ethylene-propylene-diene rubber) can be used as the rubber, by way of example.

The elastic member 42 is in contact with a lower face of the reinforce 41 and the upper face of the battery pack 10. Before the battery pack 10 is mounted onto the vehicle, the elastic member 42 can be previously fixed to one of the reinforce 41 and the battery pack 10. The fixing of the elastic member 42 can be performed, for example, by using an adhesive.

Alternatively, the elastic member 42 may not be fixed to the reinforce 41 or the battery pack 10. Specifically, the elastic member 42 can be placed between the reinforce 41 and the battery pack 10 at the time of the fixing of the reinforce 41 and the battery pack 10 to the floor panel 120.

The position to place the elastic member 42 and the size of the elastic member 42 can be set as appropriate. For example, the elastic members 42 can be distributed over the space formed between the reinforce 41 and the battery pack 10. When the battery pack 10 has a bumpy surface formed on the outside, the elastic member 42 can be placed on the bumpy surface.

In the present embodiment, the battery pack 10 is fastened to the bottom face 121a of the recessed portion 121, and the battery pack 10 is positioned to the recessed portion 121. Depending on the conditions of running of the vehicle 100, the vibration of the vehicle body is transferred to the battery pack 10 through the floor panel 120. In a configuration in which the reinforce 41 and the elastic member 42 are omitted, the battery pack 10 is more likely to be vibrated and the vibration of the battery pack 10 may produce noise. The noise produced in the battery pack 10 may be directed to the interior of the car through the luggage space LS, and the noise may reach the occupant present in the interior of the car.

In the present embodiment, the vibration of the battery pack 10 is reduced by using the reinforce 41 and the elastic member 42. The reinforce 41 is fixed to the floor panel 120 and the elastic member 42 is placed between the reinforce 41 and the battery pack 10 to press the battery pack 10 against the bottom face 121a of the recessed portion 121. The pressing of the battery pack 10 against the recessed portion 121 can reduce the vibration of the battery pack 10.

The reinforce 41 is disposed on the top of the recessed portion 121 and is fixed to the floor panel 120. Since the top of the recessed portion 120 is open, the strength thereof tends to reduce. In the present embodiment, the reinforce 41 is disposed on the top of the recessed portion 121, and the both ends 41a and 41b of the reinforce 41 are fastened to the floor panel 120.

The use of the reinforce 41 can enhance the strength at the top of the recessed portion 121. In other words, the reinforce 41 can increase the strength of the floor panel 120 on which the battery pack 10 is disposed. Even when the vehicle 100 is impacted at the back, the recessed portion 121 can be prevented from deformation to protect the battery pack 10 housed in the recessed portion 121.

The fastening structure at the fastening position P3 is different from the fastening structure at the fastening position P4. Specifically, the bolts 32 and 33 are fastened in different directions. The fastening direction at the fastening position P3 is the direction of the arrow FR, whereas the fastening direction at the fastening position P4 is the direction of the arrow UP. The different fastening directions at the fastening positions P3 and P4 can suppress the loosening of the fastening at the fastening positions P3 and P4.

If the fastening direction at the fastening positions P3 and P4 are the same, the fastening portions at the fastening positions P3 and P4 are easily loosened when the vibration is transferred to the fastening portions. In contrast, when the fastening directions at the fastening positions P3 and P4 are different from each other as in the present embodiment, the fastening portions at the fastening positions P3 and P4 are not easily loosened when the vibration is transferred to the fastening portions. This can maintain the reinforce 41 fixed securely to the floor panel 120, and the reinforce 41 can continue to press the battery pack 10 against the recessed portion 121.

Although the elastic member 42 is placed between the reinforce 41 and the battery pack 10 in the present embodiment, the present invention is not limited thereto. For example, the elastic member 42 may be omitted, and the reinforce 41 may be fixed directly to the upper face of the battery pack 10. In this case, the reinforce 41 is in contact with the upper face of the battery pack 10. Exemplary methods for the fixing of the reinforce 41 to the battery pack 10 include fastening with bolts and welding.

The reinforce 41 fixed to the battery pack 10 can improve the rigidity of the battery pack 10 (case 12). The improved rigidity of the case 12 can protect the assembled battery 11 housed in the case 12.

In the structure in which the reinforce 41 is fixed to the battery pack 10, the reinforce 41 presses the battery pack 10 against the recessed portion 121 at the time of the fastening of the reinforce 41 to the floor panel 120. The fastening positions P3 and P4 are set as appropriate to allow the reinforce 41 to press the battery pack 10 against the recessed portion 121. The pressing of the battery pack 10 against the recessed portion 121 can reduce the vibration of the battery pack 10.

Since the interval is provided between the battery pack 10 and the reinforce 41 for placing the elastic member 42 in the present embodiment, the battery pack 10 and the reinforce 41 are easily fixed to the floor panel 120.

In the structure in which the reinforce 41 is fixed to the battery pack 10, the accuracy of the fastening positions P3 and P4 of the reinforce 41 needs to be ensured and the accuracy of the fastening positions P1 and P2 of the battery pack 10 needs to be ensured at the same time. Specifically, to press the battery pack 10 against the recessed portion 121, the reinforce 41 and the battery pack 10 need to be fastened at the associated fastening positions P1 to P4 with high accuracy. For example, if the actual fastening positions of the reinforce 41 are displaced from the fastening positions P3 and P4 serving as references, the reinforce 41 does not properly press the battery pack 10 against the recessed portion 121.

In the structure using the elastic member 42, the interval is provided between the battery pack 10 and the reinforce 41, so that the high accuracy of the fastening positions P1 to P4 is not required. In other words, the battery pack 10 is only required to be fastened to the recessed portion 121 at the fastening positions P1 and P2. In addition, the reinforce 41 is only required to be fastened to the floor panel 120 at the fastening positions P3 and P4. In this case, the interval, which is provided between the battery pack 10 and the reinforce 41, varies depending on the positions of the battery pack 10 and the reinforce 41.

The elastic member 42 can be elastically deformed to be placed in the interval provided between the battery pack 10 and the reinforce 41. The thickness of the elastic member 42 is previously determined in view of the variations in the interval provided between the battery pack 10 and the reinforce 41 such that the battery pack 10 can be pressed against the recessed portion 121 with the elastic member 42 elastically deformed.

Embodiment 2

Description is now made of a structure for mounting a battery pack which is Embodiment 2 of the present invention. The present embodiment includes a mechanism for positioning a battery pack 10 to a recessed portion 121 in addition to the mounting structure described in Embodiment 1. Members identical to those described in Embodiment 1 are designated with the same reference numerals, and description thereof is omitted. The following description is mainly focused on differences from Embodiment 1.

Figure 4:
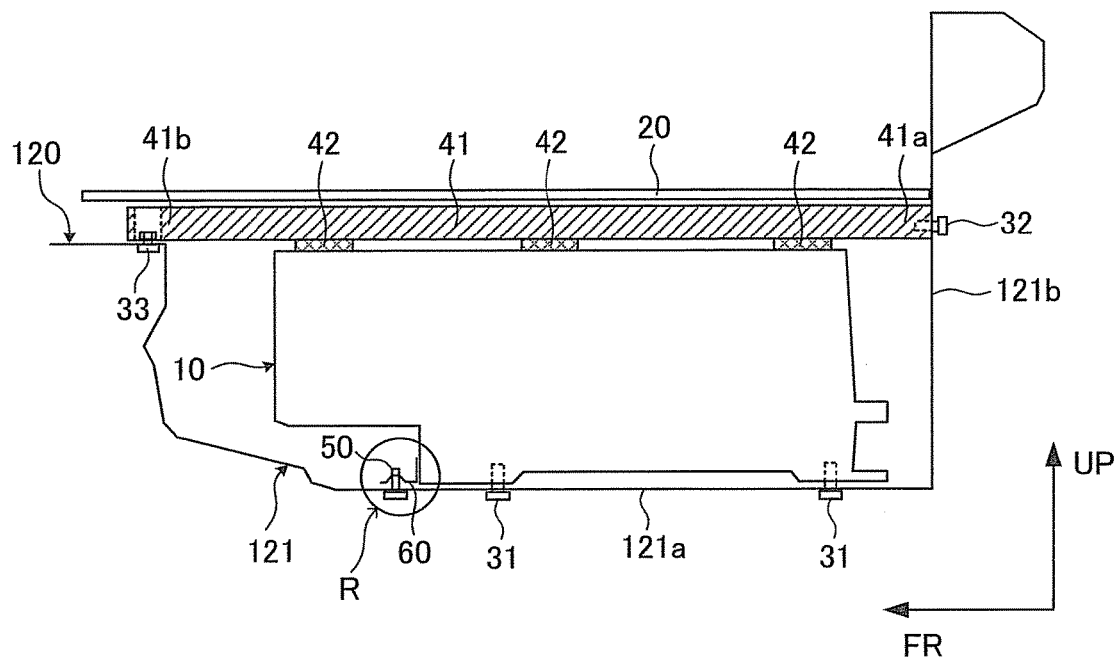
FIG. 4 is a side view of a structure for mounting a battery pack in Embodiment 2.
Figure 5:
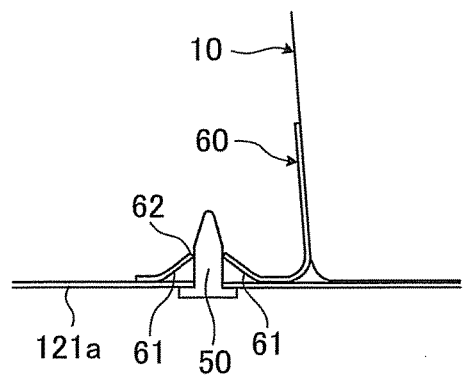
FIG. 5 is an enlarged view of a positioning mechanism in Embodiment 2.

FIG. 4 is a side view of the structure for mounting the battery pack in the present embodiment and corresponds to FIG. 2. FIG. 5 is an enlarged view of a region R shown in FIG. 4.

A pin 50 is provided to protrude toward the inside of the recessed portion 121 at a bottom face 121a of the recessed portion 121. The pin 50 extends in an upward direction of a vehicle 100. The battery pack 10 is provided with a guide member 60. The guide member 60 has a guide face 61 and an opening portion 62. The opening portion 62 is formed at an upper end of the guide face 61, and the guide face 61 has a shape widening downward from the opening portion 62.

In housing the battery pack 10 into the recessed portion 121, the pin 50 is inserted into the opening portion 62 of the guide member 60. The insertion of the pin 50 into the opening portion 62 can position the battery pack 10 to the recessed portion 121. As described in Embodiment 1, the battery pack 10 is fastened to the recessed portion 121 at the fastening positions P1 and P2 shown in FIG. 2.

Figure 6:
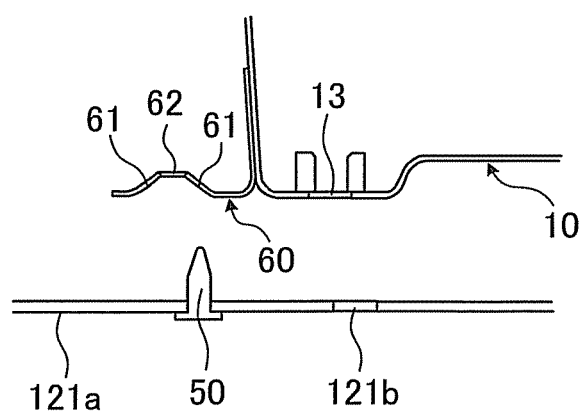
FIG. 6 is an enlarged view of the positioning mechanism in Embodiment 2.

The fastening of the battery pack 10 to the recessed portion 121 is performed by using bolts 31. As shown in FIG. 6, the battery pack 10 (case 12) and the recessed portion 121 (bottom face 121a) have opening portions 13 and 121b, respectively, formed therein for passing the bolt 31 therethrough. FIG. 6 shows the battery pack 10 before the positioning to the recessed portion 121.

For fastening the battery pack 10 to the recessed portion 121 using the bolt 31, it is necessary to align the opening portion 13 of the battery pack 10 with the opening portion 121b of the recessed portion 121. In housing the battery pack 10 into the recessed portion 121, the battery pack 10 needs to be lowered toward the recessed portion 121. At this point, the battery pack 10 obstructs the operator's view to make it difficult for the operator to check whether or not the opening portion 13 of the battery pack 10 is aligned with the opening portion 121b of the recessed portion 121.

In the present embodiment, the use of the pin 50 and the guide member 60 facilitates the placement of the battery pack 10 at a predetermined mount position. The predetermined mount position means the position where the opening portion 13 of the battery pack 10 and the opening portion 121b of the recessed portion 121 are superposed on each other. Once the battery pack 10 is positioned at the predetermined mount position, the fastening of the battery pack 10 to the recessed portion 121 can be easily achieved.

In mounting the battery pack 10 into the recessed portion 121, the tip of the pin 50 can be brought into contact with the guide face 61 of the guide member 60 to move and guide the pin 50 along the guide face 61 to the opening portion 62. Then, the pin 50 can be inserted into the opening portion 62.

The positions to provide the pin 50 and the guide member 60 can be set as appropriate. When the pin 50 and the guide member 60 are placed at the positions adjacent to the fastening position P1 as in the present embodiment, the two opening portions 13 and 121b are readily aligned with each other once the pin 50 is inserted into the opening portion 62 of the guide member 60. Alternatively, the pin 50 and the guide member 60 may be placed at positions adjacent to the fastening position P2.

The pin 50 and the guide member 60 can be provided at one point or at a plurality of points. When the pin 50 and the guide member 60 are provided at a plurality of points, any displacement of the battery pack 10 from the recessed portion 121 is suppressed more reliably.

It is contemplated that a positioning mechanism for the battery pack 10 may be provided in an area of the floor panel 120 other than the recessed portion 121. In this case, the positioning mechanism may interfere with a deck board 20 or may protrude into a luggage space LS. Since the pin 50 is provided at the bottom face 121a of the recessed portion 121 in the present embodiment, such interference with the deck board 20 can be avoided, and the luggage space LS can be effectively used.

Although the opening portion 62 into which the pin 50 is to be inserted is provided for the guide member 60 in the present embodiment, the present invention is not limited thereto. Specifically, an opening portion into which the pin 50 is to be inserted may be provided for a member different from the guide member 60. In this case, the guide member is only required to guide the pin 50 to the opening portion.

Although the pin 50 is provided for the recessed portion 121 and the guide member 60 is provided for the battery pack 10 in the present embodiment, the present invention is not limited thereto. Specifically, a pin (corresponding to the pin 50) may be provided for the battery pack 10 and a guide member (corresponding to the guide member 60) may be provided for the recessed portion 121. Such a structure can achieve the same advantages as those in the present embodiment.

The invention claimed is:

1. A structure for mounting an electric storage apparatus comprising:
   the electric storage apparatus outputting an energy for use in running of a vehicle;
   a floor panel including a recessed portion in which the electric storage apparatus is housed;
   a fastening member fixing the electric storage apparatus to the recessed portion;
   an elongate reinforcement disposed above the electric storage apparatus, the elongate reinforcement being fixed to the floor panel to pass across an entire upper side of the electric storage apparatus in a longitudinal direction, a maximum width of the elongate reinforcement in a left-right direction of the vehicle orthogonal to the longitudinal direction of the elongate reinforcement being smaller than that of the electric storage apparatus; and
   an elastic member that is in contact with both a lower surface of the elongate reinforcement and an upper surface of the electric storage apparatus and is elastically deformable in an up-down direction of the vehicle,
   wherein the electric storage apparatus is arranged on a bottom face of the recessed portion and the elongate reinforcement presses the electric storage apparatus against the recessed portion.

2. The structure for mounting the electric storage apparatus according to claim 1, further comprising a positioning mechanism for positioning the electric storage apparatus to the recessed portion,
   wherein the positioning mechanism includes:
   a pin provided for one of the electric storage apparatus and the recessed portion; and
   a guide member provided for the other of the electric storage apparatus and the recessed portion and guiding the pin to an opening portion into which the pin is to be inserted.

3. The structure for mounting the electric storage apparatus according to claim 2, wherein the positioning mechanism is disposed at a position adjacent to the fastening member.

4. The structure for mounting the electric storage apparatus according to claim 1, wherein the recessed portion is located below a luggage space of the vehicle, and
   the reinforcement extends in a front-rear direction of the vehicle.

5. The structure for mounting the electric storage apparatus according to claim 4, further comprising a first fastening member disposed along the front-rear direction of the vehicle and fastening an end portion of the reinforcement located closer to the back of the vehicle to the floor panel, and
   a second fastening member disposed along an up-down direction of the vehicle and fastening an end portion of the reinforcement located closer to the front of the vehicle to the floor panel.

6. The structure for mounting the electric storage apparatus according to claim 1, further comprising a plurality of third fastening members fastening the reinforcement to the floor panel,
   wherein the plurality of third fastening members fasten the reinforcement to the floor panel in different directions.

7. The structure for mounting the electric storage apparatus according to claim 1, wherein a plurality of the elongate reinforcements are separated with each other and are aligned in the left-right direction of the vehicle orthogonal to the longitudinal direction of each of the elongate reinforcements.

8. The structure for mounting the electric storage apparatus according to claim 1, wherein an upper end of the electric storage apparatus is below an upper end of the recessed portion.

* * * * *